US009586149B2

(12) United States Patent
Bokor et al.

(10) Patent No.: US 9,586,149 B2
(45) Date of Patent: Mar. 7, 2017

(54) COLLABORATIVE VIRTUAL BUSINESS OBJECTS SOCIAL SHARING IN A VIRTUAL WORLD

(75) Inventors: Brian R. Bokor, Raleigh, NC (US); Andrew B. Smith, Morrisville, NC (US); Peter F. Haggar, Raleigh, NC (US); Daniel E. House, Raleigh, NC (US); William B. Nicol, II, Durham, NC (US); Christopher J. Dawson, Arlington, VA (US)

(73) Assignee: International Business Machines Corporation, Armonk, NY (US)

( * ) Notice: Subject to any disclaimer, the term of this patent is extended or adjusted under 35 U.S.C. 154(b) by 2382 days.

(21) Appl. No.: 12/264,982

(22) Filed: Nov. 5, 2008

(65) Prior Publication Data

US 2010/0115425 A1    May 6, 2010

(51) Int. Cl.
*G06F 15/00*    (2006.01)
*G06F 13/00*    (2006.01)
*A63F 13/85*    (2014.01)
*A63F 13/30*    (2014.01)

(52) U.S. Cl.
CPC .............. *A63F 13/85* (2014.09); *A63F 13/12* (2013.01); *A63F 2300/575* (2013.01)

(58) Field of Classification Search
CPC ................................ A63F 13/85; A63F 13/12
USPC ........ 715/761–765, 738–741, 851–853, 700, 715/757; 705/1.1, 28
See application file for complete search history.

(56) References Cited

U.S. PATENT DOCUMENTS

| 5,892,900 | A | 4/1999 | Ginter et al. |
| 5,926,179 | A | 7/1999 | Matsuda et al. |
| 6,035,423 | A | 3/2000 | Hodges et al. |
| 6,119,229 | A | 9/2000 | Martinez et al. |
| 6,151,643 | A | 11/2000 | Cheng et al. |
| 6,414,679 | B1 | 7/2002 | Miodonski et al. |
| 6,912,565 | B1 | 6/2005 | Powers et al. |

(Continued)

OTHER PUBLICATIONS

Second Life; SecondLife, downloaded from the Internet on Sep. 1, 2010, 26 Pages, <http://web.archive.org/web/20060101031416/http://secondlife.com/>.

(Continued)

*Primary Examiner* — Kevin Nguyen
(74) *Attorney, Agent, or Firm* — Moore & Van Allen PLLC (57) ABSTRACT

Collaborative virtual business object (VBO) social sharing that may include generating a VBO responsive to an avatar performing a transaction, and providing access to the VBO to other avatars desiring access. Access to the VBO may be provided by registering information regarding accessing the VBO in an inventory of the avatar, registering information regarding accessing the VBO in a centralized registry, allowing some portions of the VBO to be searchable, or uploading a modified copy of the VBO to a centralized VBO data upload facility. Portions of the VBO may be identified as private or public and access provided to only the public portions. An apparatus for collaborative virtual business object (VBO) social sharing may include an interface configured to access virtual world and a processor configured to generate a VBO responsive to a transaction in the virtual world and provide access to the VBO.

18 Claims, 5 Drawing Sheets

(56) References Cited

U.S. PATENT DOCUMENTS

| | | | |
|---|---|---|---|
| 7,249,139 B2* | 7/2007 | Chuah et al. | |
| 7,280,991 B1* | 10/2007 | Beams et al. | 706/46 |
| 7,412,422 B2 | 8/2008 | Shiloh | |
| 7,469,217 B2 | 12/2008 | Kidd et al. | |
| 7,519,547 B2 | 4/2009 | Rodriguez et al. | |
| 7,568,017 B2 | 7/2009 | Shah et al. | |
| 7,660,778 B1* | 2/2010 | Nichols | 706/47 |
| 2001/0020231 A1 | 9/2001 | Perri, III et al. | |
| 2002/0169726 A1 | 11/2002 | Taylor et al. | |
| 2003/0014423 A1 | 1/2003 | Chuah et al. | |
| 2003/0028451 A1 | 2/2003 | Ananian | |
| 2003/0061104 A1 | 3/2003 | Thomson et al. | |
| 2003/0061171 A1 | 3/2003 | Gilbert et al. | |
| 2003/0101025 A1 | 5/2003 | Shah et al. | |
| 2003/0227392 A1 | 12/2003 | Ebert et al. | |
| 2004/0103022 A1 | 5/2004 | Chilcoat, III et al. | |
| 2004/0111327 A1 | 6/2004 | Kidd et al. | |
| 2005/0131768 A1 | 6/2005 | Rodriguez et al. | |
| 2005/0216346 A1* | 9/2005 | Kusumoto et al. | 705/14 |
| 2005/0234781 A1 | 10/2005 | Morgenstern et al. | |
| 2006/0212355 A1* | 9/2006 | Teague et al. | 705/14 |
| 2007/0073582 A1 | 3/2007 | Jung et al. | |
| 2007/0087822 A1 | 4/2007 | Van Luchene | |
| 2007/0214030 A1 | 9/2007 | Shear et al. | |
| 2007/0268299 A1 | 11/2007 | Jung et al. | |
| 2008/0004119 A1* | 1/2008 | Van Luchene et al. | 463/42 |
| 2008/0207327 A1 | 8/2008 | Van Luchene et al. | |
| 2009/0070228 A1* | 3/2009 | Ronen | 705/26 |
| 2009/0083051 A1 | 3/2009 | Bokor et al. | |
| 2009/0083052 A1 | 3/2009 | Bokor et al. | |
| 2009/0265761 A1 | 10/2009 | Evanitsky | |
| 2010/0082456 A1 | 4/2010 | Chung | |
| 2010/0115425 A1 | 5/2010 | Bokor et al. | |

OTHER PUBLICATIONS

Bokor, Brian Ronald, et al.; Non-Final Office Action dated Jun. 9, 2011 for U.S. Appl. No. 12/419,324.

Bokor, Brian Ronald, et al.; Final Office Action dated Nov. 30, 2011 for U.S. Appl. No. 12/419,324.

Bokor, Brian Ronald, et al.; Non-Final Office Action dated Aug. 16, 2012 for U.S. Appl. No. 12/419,324.

Bokor, Brian Ronald, et al.; Final Office Action dated Jan. 10, 2013 for U.S. Appl. No. 12/419,324.

* cited by examiner

COLLABORATIVE VIRTUAL BUSINESS OBJECTS SOCIAL SHARING IN A VIRTUAL WORLD

BACKGROUND OF THE INVENTION

The present invention is related to virtual worlds, and more specifically to collaborative virtual business objects social sharing in a virtual world.

A virtual world is a computer based simulated environment intended for its residents to traverse, inhabit and interact through the use of avatars. Virtual worlds are typically represented using three-dimensional (3D) graphics and landscapes and are may be populated by many thousands of users, known as "residents". Often, a virtual world resembles the real world in terms of physics, houses, landscapes, businesses, etc.

Currently, sharing information with friends or groups of people about items (both in the real and virtual world) that an avatar (or user associated with the avatar) has recently purchased is a very daunting and difficult task. Typically, one desiring to share information regarding a purchase would have utilized the phone, email, share a link to a product from a particular website etc. All known solutions require a manual process or a face to face conversation. Further, it is challenging for merchants to effectively advertise both real world and virtual world products and services within a virtual universe. Avatars in a virtual world are often busy in business or social interactions and do not want the interruptions of advertisements. Avatars also do not want unattractive advertisements and signs all over the virtual world landscape.

BRIEF SUMMARY OF THE INVENTION

According to one aspect of the present invention, a method for collaborative virtual business object (VBO) social sharing that includes generating a VBO responsive to an avatar performing a transaction and providing access to the VBO to other avatars desiring access.

According to another aspect of the present invention, an apparatus for collaborative virtual business object (VBO) social sharing includes an interface configured to access a virtual world and a processor configured to generate a VBO responsive to a transaction in the virtual world and provide access to the VBO.

According to a further aspect of the present invention, a computer program product comprising a computer useable medium having computer useable program code embodied therewith, the computer useable program code comprising computer useable program code configured to generate a VBO responsive to an avatar performing a transaction, and computer useable program code configured to provide access to the VBO to other avatars desiring access.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, microcode, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the present invention a virtual business object may be generated in response to purchase of either a real or virtual world product or service by an avatar in a virtual world. An example may be a new music player from a local real world store or a virtual picture bought in the virtual world. A virtual business object (VBO) may be a representation of the product or service complete with meta data associated with the product such as, for example, product specifications, images, reviews, etc. Vendors within the virtual world may make references or even distribute elements of virtual business objects to avatars that are considering purchasing the real world product or have purchased the product.

Moreover, according to embodiments of the present invention, avatars can share information associated with a purchased product or service through the use of a virtual business object providing other avatars with information to help them better determine whether they should buy the item. When an item or product is purchased, an associated virtual business object representing the item may be placed in an inventory of the avatar. This VBO may be updated by the owner avatar to include personal experiences with the item. For example, may add to the VBO comments or a review such as "this item is good value for the money." Further, subsections of the VBO may be made public by the owner avatar such that information can be shared allowing other avatars to retrieve and review "real user information" rather than just pure advertisements from a vendor. At the same time, elements of the VBO may remain private such as, for example, receipts, warranty information, purchase history, etc. and not be made available to other avatars.

Therefore, embodiments of the present invention allow an avatar to easily share product information through the use of a VBO and product information (i.e., VBO details) with other people such as friends, groups of friends, avatars or any other group(s). Embodiments of the present invention allow a VBO to be shared providing a socialized solution that minimizes the full data that one may provide to a friend or group of friends where the friends or group of friends get correct product information that you are sharing. For example, only portions of the VBO that are desired to be public may be shared while other portions, considered private, may not be shared. Information related to a product number, product manuals, details of the product, original picture or visual representing the product, may be shared with others via the VBO. In contrast, information associated with the VBO such as, for example, payment details, shipping details, specific warranty or extended warranty details, etc. may be considered private and not shared. Further, a shared VBO may contain options that may be performed using the shared VBO such as, ordering the product, getting more information regarding the product, etc. To help illustrate embodiments of the present invention, a shared VBO may be referred to as a "VBO Light".

A real world user with an associated avatar within a virtual world, may log on to a website and purchase an item, for example, a new stereo. The object may be ordered and shipped to the user. After the purchase transaction, a vendor of the stereo may create a VBO which contains both public and private information associated with the purchase. This VBO may include information such as, for example, a name of the product, purchase date, product details, warranty information, price of the product, shipping costs, etc. Some of these fields may be flagged as private (e.g., price of product), limited share (e.g., shareable only with friends or other groupings of avatars), or publicly available. The VBO may also be expanded by including fields that are not filled in by the vendor such as, for example, rating of product (e.g., 1-5), reliability (e.g., "this product is working well although the volume knob is a little easy to snap off"), other products that are similar, other information (e.g., "I love the sound that it makes and would definitely recommend it to others"), etc. Each avatar that has purchased the product may keep a copy of the VBO in his or her inventory. Portions or elements of this VBO (VBO light) may be shared with other avatars.

According to embodiments of the present invention, decentralized VBOs may be stored in separate avatar inventories where an avatar may make a request to read or have a copy (VBO light) of the VBO of another avatar to determine whether he or she would like to purchase the object/product/item associated with the VBO. An avatar may acquire knowledge regarding which other avatars have already purchased particular products through conventional communication methods.

Moreover, according to embodiments of the present invention, a centralized VBO registry within a virtual world may hold a list of which avatars have VBOs related to specific products. When an avatar receives a new VBO because a product has been purchased, a linkage and/or other information to that specific avatar may be recorded in a table that is accessible by other avatars. Information such as, for example, "Chris just purchased a stereo. You can contact Chris and request to view his VBO. Here is how to contact Chris . . . ." Further, an avatar may use conventional methods to locate the avatar called Chris and ask him to view his VBO.

In addition, according to embodiments of the present invention, a centralized VBO data upload facility may be provided where any non-private information may be uploaded to a centralized database such that all non-private information can be collected. Information collected in the centralized VBO data upload facility may be synchronized with a VBO that was the source of the information. The synchronization may occur manually, periodically, or constantly. The owner of each VBO may be anonymous to those accessing the information from the centralized VBO data upload facility. Therefore, an avatar may wish to purchase a new product and may request to read all non-private VBO information regarding the new product that may be stored in the centralized database before making a decision on the purchase.

Further, according to embodiments of the present invention, a search may be initiated across publicly available VBO data across an entire system. Each avatar may make elements of their VBO available to be searched. This may be accomplished through various mechanisms, for example, web feeds (such as Really Simple Syndication (RSS) or Atom) that allow software programs to check for updates published by other applications of web sites. As noted previously, any centralized database containing VBO information may be kept up to date by synchronizing the data with any changes made to a specific VBO that shared/sent the information to the database.

According to embodiments of the present invention, the information that may be sharable and given to another avatar, may be configurable by the avatar having the VBO. Further, the information that may be shared and options that might be provided when giving a VBO to another may be preconfigured by a seller who creates the VBO. For example, a VBO may be limited to only give certain details within each encapsulated data item. For example, as mentioned previously, warranty details for the product might be given but not any user specific items such as, for example, extended warranty, registration details, etc. A security layer may be in place to eliminate problems that may occur such as identity theft.

A VBO may be made available to another avatar by providing a version (VBO light) of the original VBO to another user or avatar or placing the VBO light in a space that only a specific user or avatar may view and/or pick up for their own inventory. An inventory of an avatar may be extended to contain an area where shared products and feedback products are separate from normal inventory space.

As noted previously a version of a VBO retaining public or sharable information may be referred to for illustrative purposes as a VBO light. A VBO light may be allowed to have extensions and interactions, either provided from the owner avatar or from the original seller or creator of the original VBO, as to what options may and should be supplied if the VBO is shared. A VBO light may take the form of a product, service, and/or anything else that may be shared from an original business transaction. A VBO light may also be configured to assign a user/avatar or a group of users/avatars that may have access to receive this VBO light. A VBO light may also contain deviations of original data (e.g., warranty, instructions, parts list, product info, contracts, supporting products, etc.) from the original VBO.

Moreover, according to embodiments of the present invention, a feedback mechanism may be provided by the VBO to the seller when a VBO is shared such as popular functions currently provided by retailers (e.g., similar to where a web includes user ratings and feedback for product items on the retailer's website). This feedback information may be tied to the process of sharing a VBO with friends, groups or repositories where another user or avatar that accesses a shared VBO may be able to view ratings and/or feedback, etc. related to the product associated with the VBO.

Figure 1:
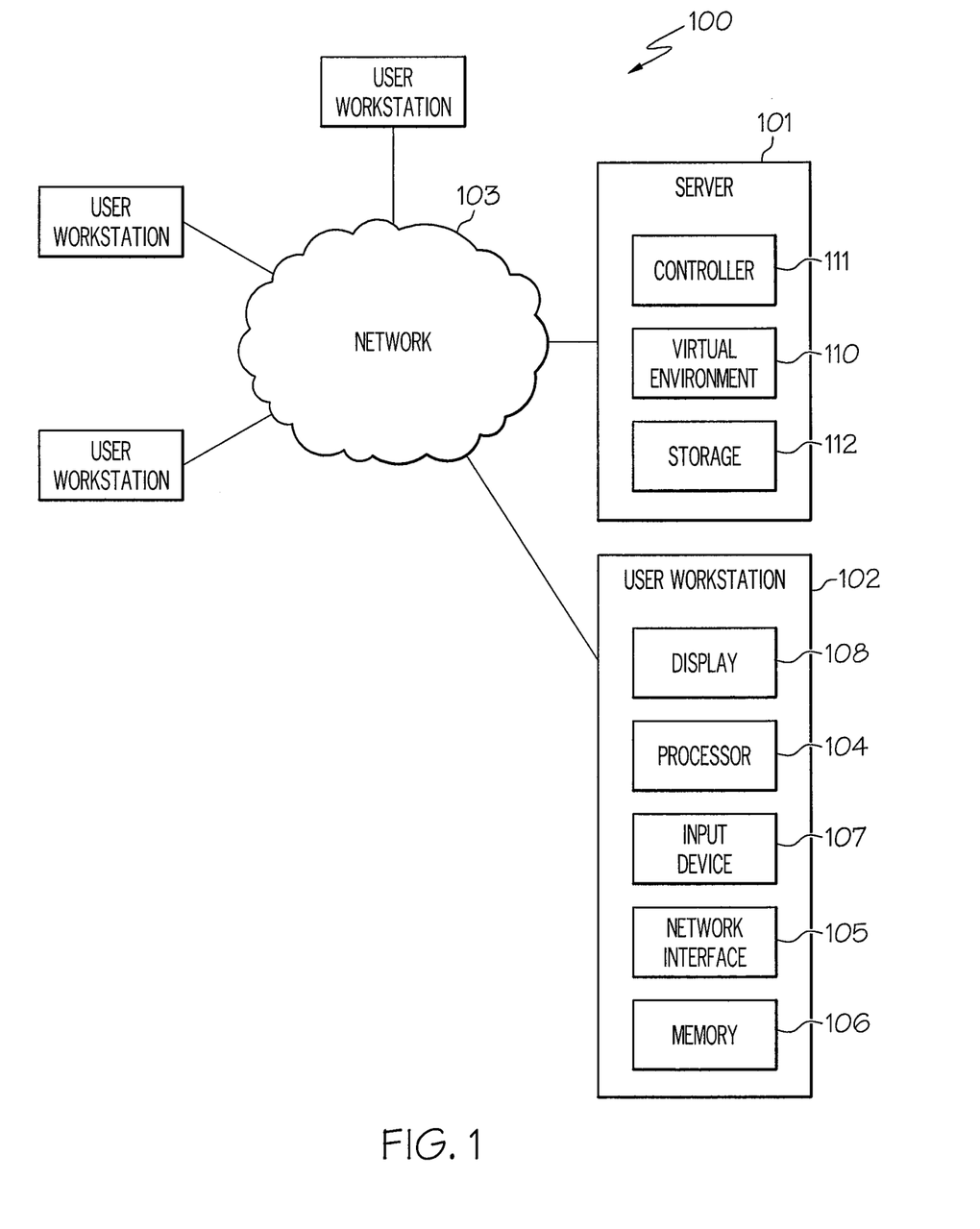
FIG. 1 is a diagram of system for collaborative virtual business object (VBO) social sharing according to an exemplary embodiment of the present invention.

FIG. 1 shows a diagram of system for collaborative virtual business object (VBO) social sharing according to an exemplary embodiment of the present invention. The system 100 may include a server 101 and one or more workstations 102 where the server 101 and the one or more workstations 102 may be interconnected to a network 103. Each workstation 102 may include components typically found in a workstation such as, for example, a processor 104, a network interface 105, a storage device 106, an input device 107, a display 108, etc. Moreover, although one server 101 is shown, there may be multiple servers connected to the network 103 and accessible by the one or more workstations 102. The server 101 may host the virtual environment 110 and also contain a controller 111 and storage 112. Although not shown, the server 101 may also include components typically found in a server such as, for example, a network interface, an input device, etc. Therefore, a buyer at a workstation 102 may access the virtual environment 105 hosted on the server 101 and control an avatar in the virtual environment 105 to buy products or make other purchases or business transactions with a person, store, vendor, manufacturer, supplier, etc., which may also access the virtual environment and provide the products or services for sale in the virtual environment. The supplier of the product or services may also access the virtual world or environment 105 hosted on the server 101 via one or more workstations 102. Further, a virtual business object (VBO) may be generated by a seller or supplier of the product or services, a vendor, a retailer, or a manufacturer upon completion of the transaction and sent to the buyer. The VBO may contain information related to the purchased product or service and the completed transaction. The VBO may be stored in an inventory of the user of avatar or may be stored at a server. Extension or interaction options may be defined for the VBO by the avatar or the seller. Although a server is shown as hosting the virtual environment 105, any type of network entity capable of hosting a virtual environment is within the scope of the present invention.

Moreover, a user at a workstation 102 may provide access to the VBO to other avatars desiring access or control an avatar to provide access to the VBO to other avatars desiring access. Access to the VBO may be provided in any of many different ways. For example, access to the VBO may be provided by providing access to the VBO in an inventory of the avatar to the other avatars desiring access, by registering information regarding accessing the VBO in a centralized registry, by registering information regarding accessing the VBO in the inventory of the avatar, by allowing some portions of the VBO to be searchable, or by uploading a modified VBO to a centralized VBO data upload facility, the modified VBO being a copy of the VBO containing only public information. The registered information may include, for example, contact information for a user or an avatar having the VBO or a link to the VBO.

Moreover, a server 101 may provide access to the VBO to other avatars desiring access. Access to the VBO may be provided in any of the same methods noted previously. For example, access to the VBO may be provided by providing access to the VBO in an inventory of the avatar stored at the server to the other avatars desiring access, by registering information regarding accessing the VBO in a centralized registry at the server or other device, by registering information at the server regarding accessing the VBO in the inventory of the avatar located on the workstation 102, the server 101, or other device, by configuring the VBO at the server to allow some portions of the VBO to be searchable, or by uploading a modified VBO to a centralized VBO data upload facility, the modified VBO being a copy of the VBO containing only public or shareable information. The registered information may include, for example, contact information for a user, an avatar, server or other device having the VBO or a link to the VBO.

A user or an avatar of the user or a server may generate a partial version of the VBO (i.e., VBO light). The VBO light may contain the same information as the VBO except information personal to the buyer such as, for example, warranty information, cost information, purchase receipt information, shipping information, etc. The VBO light may contain components and actions that may be initiated from the VBO light such as, for example, purchase product/service, discard VBO light, request additional information regarding product/service, etc. The user or an avatar of the user or a server may provide access to the VBO light to other avatars desiring access.

According to embodiments of the present invention, new information may be added to the VBO or the modified VBO (VBO light) and the new information synchronized between the VBO and the modified VBO. Moreover, portions of the VBO may be identified by a user or an avatar of the user as private and public and access provided to only the public portions of the VBO to the other avatars desiring access. The public portions of the VBO may include, for example, a product description, a product manual, a product picture, a product rating, information regarding a reliability of the product, product feedback reviews, other products similar to a product related to the VBO, or options that can be performed on the VBO. The private portions of the VBO may include, for example, a product purchase price, product warranty information, or product shipping information.

Figure 2:
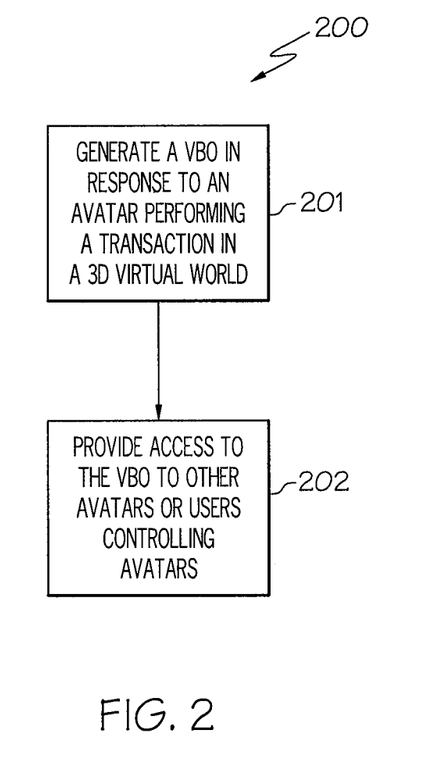
FIG. 2 is a flowchart of a process for collaborative virtual business objects sharing according to an exemplary embodiment of the present invention.

FIG. 2 shows a flowchart of a process for collaborative virtual business objects sharing according to an example embodiment of the present invention. In the process 200, block 201, a VBO may be generated in response to an avatar performing a transaction in a 3D virtual world. In block 202, access to the VBO may be provided to other avatars in the virtual world or to users controlling avatars.

Figure 3:
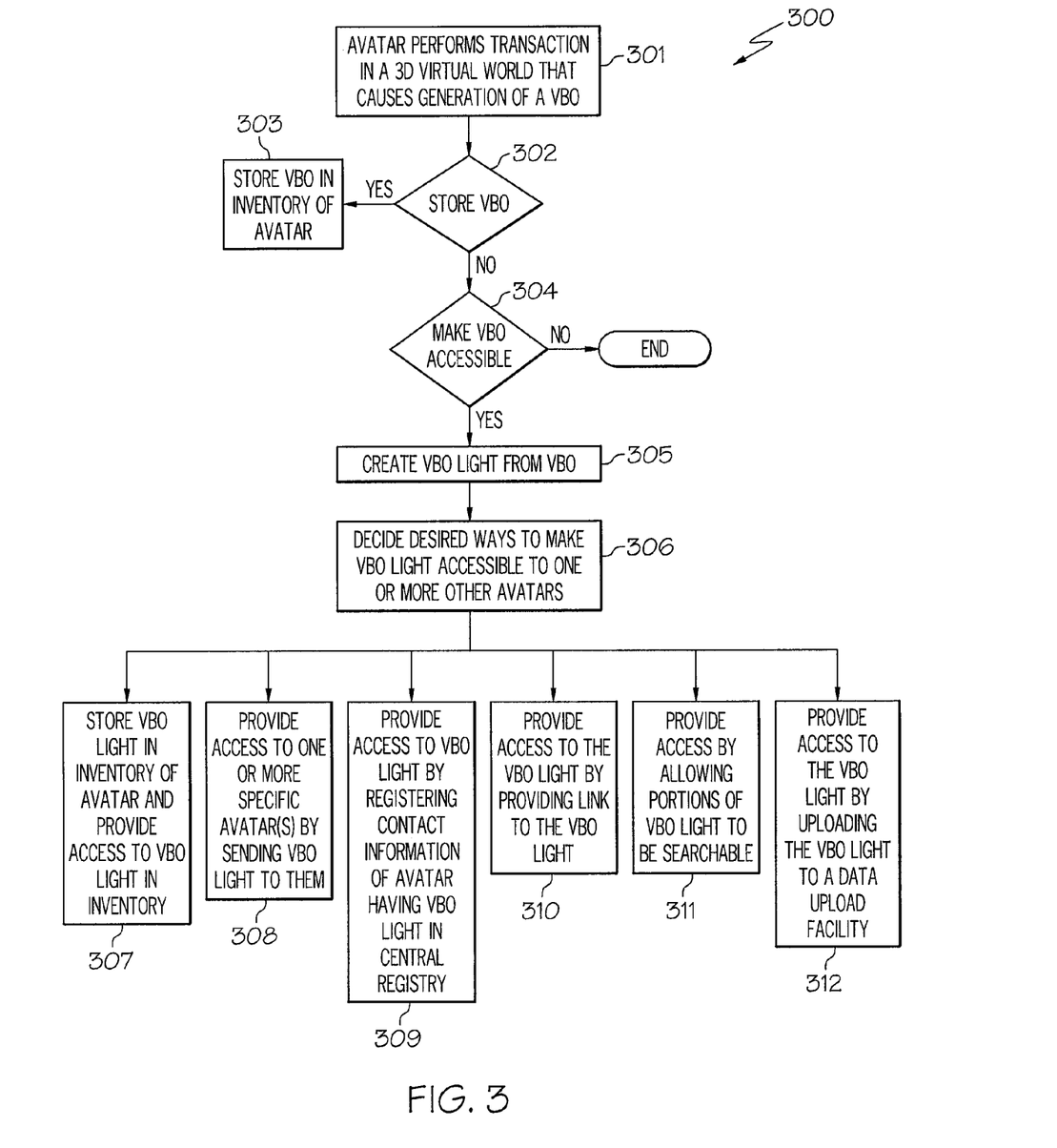
FIG. 3 is a flowchart of a process for making a VBO accessible according to an exemplary embodiment of the present invention.

FIG. 3 shows a flowchart of a process for making a VBO accessible according to an example embodiment of the present invention. In the process 300, in block 301, an avatar may perform a transaction in a 3D virtual world that causes generation of a VBO. In block 302, it may be decided whether to store the VBO and if so, in block 303, the VBO may be stored in an inventory of an avatar. In block 304, it may be decided whether to make portions of the VBO accessible and if not, the process ends. If it is desired to make portions of the VBO accessible, then in block 305, a second VBO (referred to as a VBO light) may be created from the VBO where the VBO light may be a copy of portions of the VBO that are made accessible to others. In block 306, a user or avatar may decide desired ways to make the VBO light accessible to one or more other avatars (or users). For example, in block 307, the VBO light may be stored in an inventory of the avatar and access to the VBO light in the inventory may be provided to other avatars. In block 308, access may be provided to one or more specific avatars by sending the VBO light to them. In block 309, access may be provided to the VBO light by registering contact information of an avatar having the VBO light in a central registry. Further, in block 310, access may be provided to the VBO light by providing a link to the VBO light to one or more avatars. In block 311, access may be provided by allowing portions of the VBO light to be searchable by other avatars. In block 312, access may be provided to the VBO light by uploading the VBO light to a data upload facility where other avatars may access the VBO light.

Figure 4:
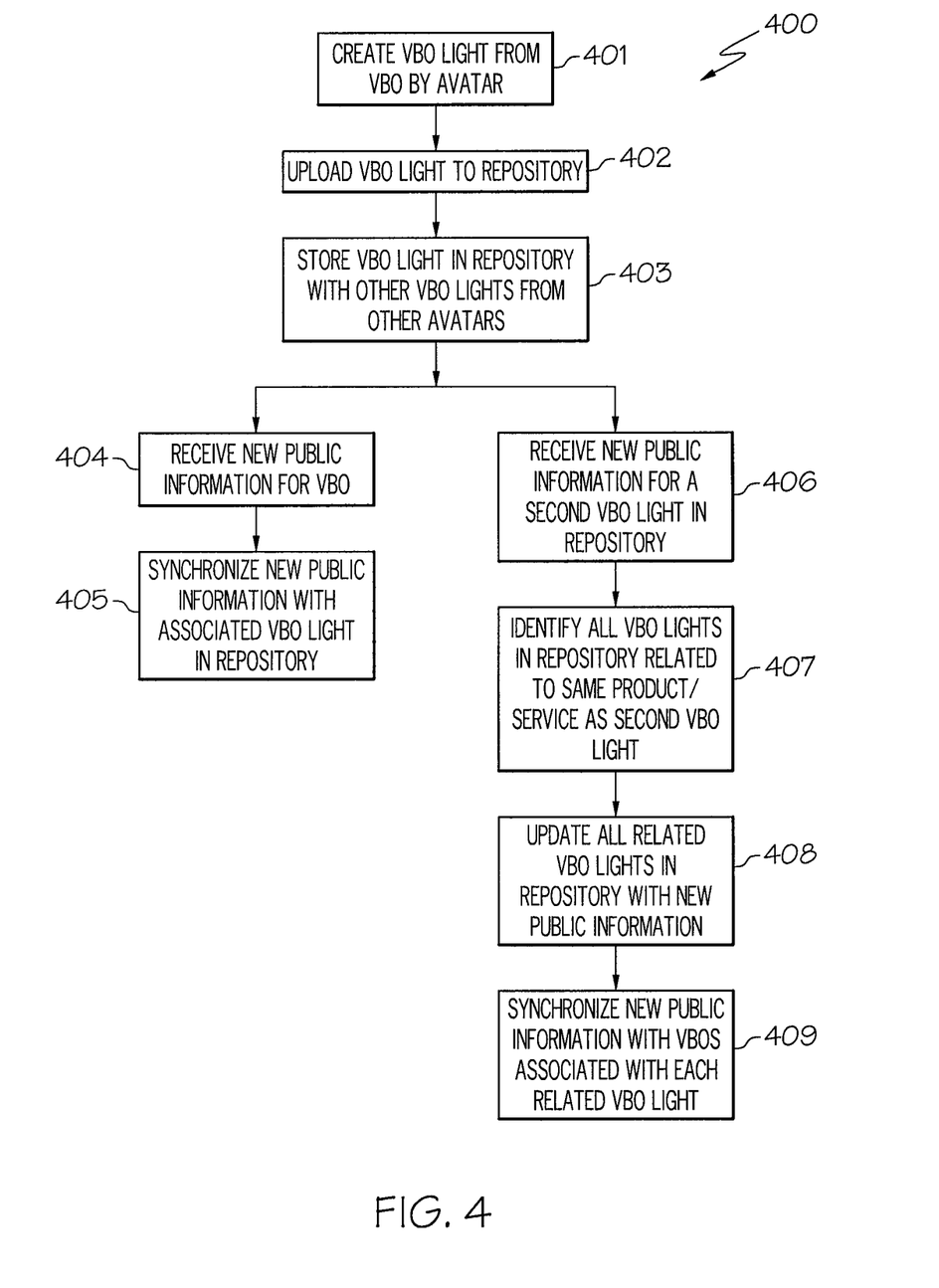
FIG. 4 is a flowchart of a process for synchronizing VBO data according to an exemplary embodiment of the present invention.

FIG. 4 shows a flowchart of a process for synchronizing VBO data according to an example embodiment of the present invention. In the process 400, in block 401, a VBO light may be created from an original VBO by an avatar. In block 402, the VBO light may be uploaded to a repository. In block 403, the VBO light may be stored in the repository along with other VBO lights from other avatars. In block 404, new public (i.e., sharable) information may be received for the original VBO and then in block 405, the new public information may be synchronized with the associated VBO light in the repository. Further, in block 406, new public/sharable information may be received for a second VBO light stored in the repository. Then in block 407, all VBO lights in the repository that may be related to the same product/service as the second VBO light may be identified. In block 408, the identified related VBO lights in the repository may all be updated with the new public information. In block 409, the new public information may be synchronized with the VBOs associated with each of the related VBO lights.

Figure 5:
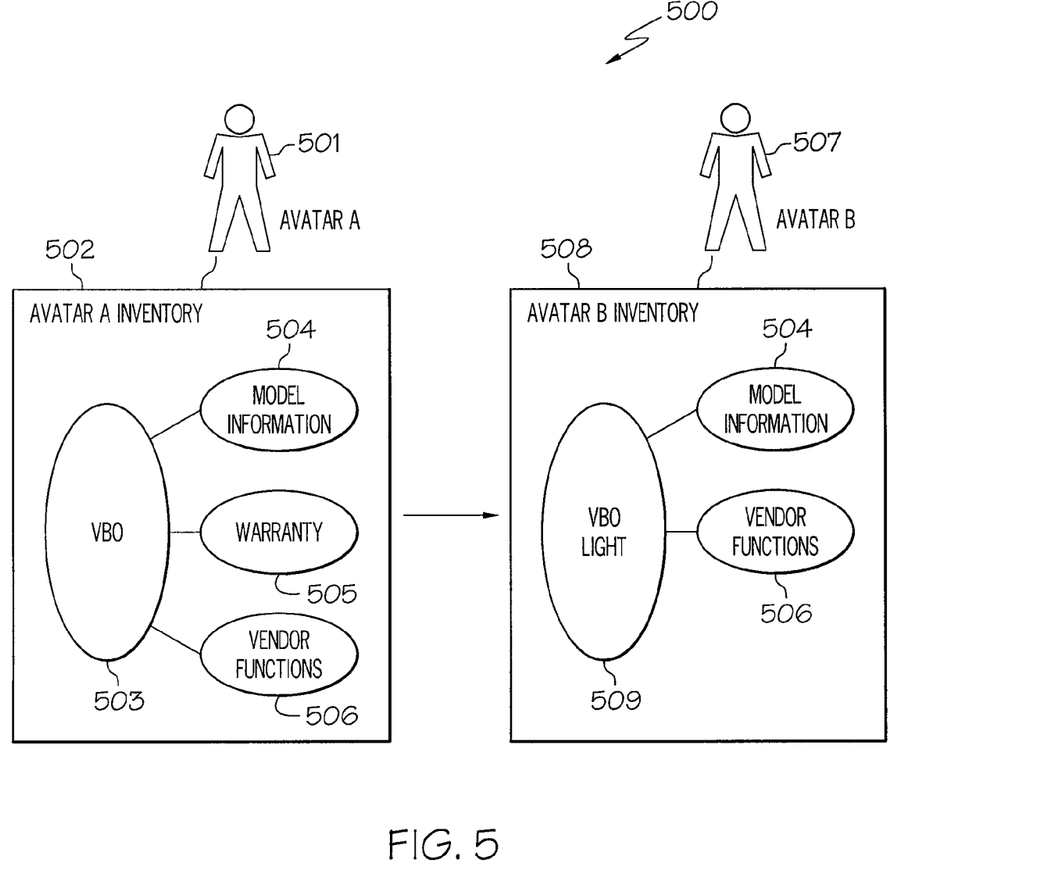
FIG. 5 is a diagram illustrating creation of a VBO light from a VBO according to an exemplary embodiment of the present invention.

FIG. 5 shows a diagram illustrating creation of a VBO light from a VBO according to an example embodiment of the present invention. A first avatar 501 may have a VBO 503 stored in an inventory 502 of the first avatar 501. The VBO 503 may include objects or information such as product model information 504, warranty information 505, vendor functions that may be performed using the VBO 506, or other information associated with the product or service related to the VBO 503. The first avatar 501 may create a VBO light 509 and provide the VBO light 509 to a second avatar 507. The second avatar 507 may store the VBO light 509 in an inventory 508 of the second avatar 507. The VBO light 509 may contain public or sharable information such as, for example, product model information 504, vendor functions 506, etc. Since the warranty information 505 associated with the original VBO 503 is personal to the first avatar 501, this information may not be shared and provided in the VBO light 509. The second avatar 507 may review the information in the VBO light to help make a decision regarding purchasing the product or service associated with the VBO light 509. Further, the second avatar 507 may initiate a vendor function 506 where more information regarding the product/service may be provided to the second avatar 507, or may initiate a transaction allowing the second avatar 507 to purchase the product or service associated with the VBO light.

Therefore, embodiments according to the present invention provide a social networking aspect to products and services that allow sharing information that is more visual in nature and provides a way to distribute data more effectively and efficiently. For example, virtual world retailers may want to provide sharable VBOs when people or avatars purchase an item thus enabling a social networking effect where users communicate about goods or services by trading VBOs.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for collaborative virtual business object (VBO) social sharing comprising:
   generating, by a computer, a VBO in response to a purchase made by an avatar, wherein the purchase is related to at least one of a product and a service; and
   providing, by the computer, access to the VBO to other avatars desiring access,
wherein the VBO comprises metadata associated with the product or service, the metadata comprising at least one of a product or service number, price, specification, review, manual, image, visual representation, payment details, shipping details, and warranty details, and wherein providing access to the VBO comprises uploading a modified copy of the VBO to a centralized VBO data upload facility, the modified copy of the VBO containing only shareable information from the VBO.

2. The method according to claim 1, further comprising storing the VBO in an inventory of the avatar.

3. The method according to claim 2, further comprising providing access to the VBO in the inventory of the avatar to the other avatars desiring access.

4. The method according to claim 1, wherein the access to the VBO is provided by allowing registration of information regarding accessing the VBO in a centralized registry.

5. The method according to claim 1, further comprising storing the VBO in an inventory of the avatar and providing access to the VBO by allowing registration of information regarding accessing the VBO in the inventory of the avatar.

6. The method according to claim 5, wherein the registered information comprises at least one of contact information for an avatar having the VBO and a link to the VBO.

7. The method according to claim 1, wherein providing access to the VBO comprises allowing some portions of the VBO to be searchable.

8. The method according to claim 1, further comprising allowing new information to be added to at least one of the VBO and the modified copy the VBO and synchronizing the new information between the VBO and the modified copy of the VBO.

9. The method according to claim 1, further comprising identifying portions of the VBO as one of private and public and providing access to only the public portions of the VBO to the other avatars desiring access.

10. The method according to claim 9, wherein the public portions of the VBO comprise at least one of a product description, a product manual, a product picture, a product rating, information regarding a reliability of the product, product feedback reviews, other products similar to a product related to the VBO, and options that can be performed on the VBO.

11. The method according to claim 9, wherein the private portions of the VBO comprise at least one of a product purchase price, product warranty information, and product shipping information.

12. The method according to claim 1, further comprising allowing creation of the modified VBO and defining access to the modified VBO by at least one of the avatar and a seller of the product or service involved in the purchase, the modified VBO being a copy of the VBO containing only public information.

13. The method according to claim 12, further comprising defining at least one of extension and interaction options for the modified VBO by at least one of the avatar or the seller.

14. The method according to claim 1, further comprising defining a set of at least one other avatar and providing access to the VBO only to the defined set of avatars.

15. An apparatus for collaborative virtual business object (VBO) social sharing comprising:
   an interface configured by a computer to access a virtual world;
   a processor configured by the computer to generate a VBO in response to a purchase made by an avatar in the virtual world and to provide access to the VBO, wherein the purchase is related to at least one of a product and a service, wherein the VBO comprises metadata associated with the product or service, the metadata comprising at least one of a product or service number, price, specification, review, manual, image, visual representation, payment details, shipping details, and warranty details, and wherein providing access to the VBO comprises uploading a modified copy of the VBO to a centralized VBO data upload facility, the modified copy of the VBO containing only shareable information from the VBO.

16. The apparatus according to claim 15, wherein the processor provides access to the VBO to avatars in the virtual world.

17. A computer program product comprising a non-transitory computer useable storage medium having computer useable program code embodied therewith, the computer useable program code comprising:
   computer useable program code configured to generate a Virtual Business Object (VBO) in response to a purchase made by an avatar, wherein the purchase is related to at least one of a product and a service; and computer useable program code configured to provide access to the VBO to other avatars desiring access, wherein the VBO comprises metadata associated with the product or service, the metadata comprising at least one of a product or service number, price, specification, review, manual, image, visual representation, payment details, shipping details, and warranty details, and wherein providing access to the VBO comprises uploading a modified copy of the VBO to a centralized VBO data upload facility, the modified copy of the VBO containing only shareable information from the VBO.

18. The computer program product according to claim 17, further comprising computer useable program code configured to store the VBO in an inventory of the avatar.

* * * * *